United States Patent

[11] 3,620,695

| [72] | Inventor | Frederic C. McCoy<br>Beacon, N.Y. |
|---|---|---|
| [21] | Appl. No. | 815,231 |
| [22] | Filed | Apr. 10, 1969 |
| [45] | Patented | Nov. 16, 1971 |
| [73] | Assignee | Texaco Inc.<br>New York, N.Y. |

[54] THICKENED COMPOSITIONS AND PROCESS OF PREPARING THEM
25 Claims, No Drawings

[52] U.S. Cl. ............................................. 44/7 D, 149/109
[51] Int. Cl. ................................................ C10l 7/02
[50] Field of Search ................................... 44/7 C; 149/109

[56] References Cited
UNITED STATES PATENTS

| 3,355,269 | 11/1967 | Winkler | 44/7 C |
| 3,401,027 | 9/1968 | Dreher | 44/7 C |

*Primary Examiner*—Benjamin R. Padgett
*Attorneys*—K. E. Kavanagh and Thomas H. Whaley

ABSTRACT: This invention concerns a process for thickening certain organic liquids comprising admixing the liquid to be thickened with critical rates of reactants comprising:
a. at least one relatively high molecular weight primary monoamine soluble in said liquid,
b. at least one relatively low molecular weight primary monoamine or ammonia, and
c. at least one organic polyisocyanate, until a substantial increase in the viscosity of the liquid is obtained.

THICKENED COMPOSITIONS AND PROCESS OF PREPARING THEM

This invention concerns a novel process for preparing thickened organic liquids and the resultant compositions produced therein.

More particularly, this invention concerns the preparation of thickened compositions by a process heretofore undescribed in the literature.

The thickening or gelation of organic liquids has widespread utility in industry. For example, paint vehicles are thickened to prevent running during application and to minimize settling of the pigments during storage. Similarly lubricating oils are thickened to produce greases which are more tenacious lubricants for certain uses than are the unthickened parent oils. Still other applications are the thickening of gasoline and kerosene fractions to produce gelled gasoline and jet fuels, and the thickening of pharmaceutical vehicles for the preparation of lotions, jellies and creams.

While there is no paucity of thickening compositions per se, relatively few compositions are suitable for utilization as fuel thickeners. For this type of application not only must the thickeners be low in cost, and compatible with a variety of additives, but they must be stable for extended periods of time and preferably be ashless upon combustion. Thickening compositions possessing these characteristics coupled with ease of preparation not only have value in fuel applications but lend themselves to a variety of other industrial uses where the gelling of organic liquids is desired.

It is a broad object of this invention to provide a novel process for thickening organic liquids.

It is another object of this invention to prepare stable, thickened compositions by the above-described process.

A more specific object of this invention is the preparation of stable, thickened gas turbine fuel compositions which are ashless upon combustion.

Another object of this invention is the preparation of organic vehicles suitable for dispersing solids such as pigments, insecticides and the like for extended periods of time.

Additional objects will suggest themselves to those skilled in the art after a perusal of this disclosure.

The above objects are achieved by the process described below:

In practice the organic liquid to be thickened is contacted with an admixture comprising:

a. at least one relatively high-molecular weight primary monoamine soluble in said liquid, b. at least one relatively low-molecular weight primary monoamine or ammonia, soluble or dispersible in said liquid, and c. at least one organic polyisocyanate, until a thickened organic liquid is produced.

In the favored practice, the organic liquid to be thickened is contacted with at least 0.05 percent by weight of an admixture comprising:

a. at least one relatively high-molecular weight primary monoamine soluble in said liquid, b. at least one relatively low-molecular weight primary monoamine or ammonia, soluble or dispersible in said liquid, and c. at least one organic diisocyanate until thickening of the organic liquid takes place.

Under the most favored conditions, the thickening process is accomplished using between 0.05 and 15 percent of the admixture wherein the molar ratio of the relatively high-molecular weight amine to the relatively low-molecular weight amine ranges from about 10:1 to 1:10 and the molar ratio of total amine to organic diisocyanate is at least 1.8:1. When tri- or higher isocyanates are employed in proportionally higher ratio of total amine to isocyanate is required.

The above process lends itself to two variations depending upon whether maximum viscosity alone or increased viscosity coupled with maximum clarity is desired.

To obtain increased viscosity combined with maximum clarity in the thickened liquid the process comprises the steps of:

a. admixing the liquid to be thickened with:
 1. at least one relatively high-molecular molecular weight primary monoamine soluble in said liquid, and
 2. at least one organic polyisocyanate to form a clear admixture, the molar ratio of amine to diisocyanate being less than about 1.8:1, preferably from about 0.5:1 to about 1:1, then b. blending into the admixture at least one relatively low-molecular weight primary monoamine, or ammonia, to form a reaction mixture in which the total concentration of amines plus polyisocyanate represent between 0.05 and 15 percent of the weight of the thickened organic liquid, the molar ratio of the relatively high-molecular weight amine to the relatively low-molecular weight amine ranging from about 10:1 to 1:10, and the molar ratio range of total amine to polyisocyanate being from about 1.8:1 to 3.0:1, until a substantial increase in the viscosity of organic liquid takes place.

To obtain significantly increased viscosity without regard to clarity, the process comprises the steps of:

a. contacting the liquid to be thickened with
 1. at least one relatively high-molecular weight primary monoamine soluble in said liquid,
 2. at least one relatively low-molecular weight primary monoamine or ammonia soluble or dispersible in said liquid to form an admixture, then b. contacting said admixture with at least one organic polyisocyanate to form a reaction mixture in which the concentration of amines plus polyisocyanate represents between 0.05 and 15 percent of the weight of the thickened organic liquid including additives, the mole ratio of the relatively high-molecular weight amines to the relatively low-molecular weight amine ranging from about 10:1 to 1:10, and the molar ratio range of total amine to polyisocyanate being from about 1.8:1 to 3.0:1, until a substantial increase on the viscosity of the organic liquid is obtained.

It should be noted that regardless of the process variant employed the results obtained are unexpected in view of what takes place when only one of the amine pairs are contacted with a polyisocyanate in an organic liquid. For example the in situ reaction in kerosene of either amine, low- or high-molecular weight alone, with a polyisocyanate in the molar ratio range of 1.8:1 to 3.0:1 usually produces little or no increase in viscosity, while the reaction of both amines in kerosene with a polyisocyanate produces a substantial increase in viscosity of the kerosene liquid.

In order to aid in the understanding of the inventive concept, the following supplementary disclosure is submitted:

A—Organic Liquids—As used throughout this application, this term refers to liquids which satisfy all of the following conditions:

1. The liquid possesses no relative hydrogen atoms which will react with either one of the amines or the polyisocyanates, 2. The liquid will dissolve the relatively high-molecular weight amine component and will remain clear upon the addition of the polyisocyanate to the solution in the molar ratios previously cited, and 3. The liquid will dissolve or disperse relatively low-molecular weight amine components, or ammonia, and will produce a precipitate upon addition of a polyisocyanate to the solution.

Illustrative organic liquids which can be thickened by the inventive process, include hydrocarbons such as paraffins, naphthenes, aromatics such as benzene and toluene, halogenated hydrocarbons such as carbon tetrachloride and methylene dichloride, petroleum fractions such as kerosene, gasoline, lube oils, gas oils, fuel oils, paraffin waxes, synthetic esters such as alkyl esters of di- and polybasic acids, natural fats and oils such as beef and pork fats, corn oil, soybean oil, cottonseed oil, linseed oil, sperm oil, etc. Inasmuch as thickened gasolines and kerosenes have utility as fuels, these represent the preferred substrates for thickening.

B—Organic Polyiscyanates—This term as used herein includes compounds containing at least two reactive isocyanate groups. These compounds can be aliphatic, cycloaliphatic or aromatic. Illustrative polyisocyanates include: 2,4-tolylene diisocyanate, 2,6-tolylene diisocyanate, 3,3-bitolylene-4,4'-diisocyanate, m-phenylene diisocyanate, p-phenylene diisocyanate, p,p'-diisocyanate biphenyl, 1,6-diisocyanato benzene, tris p-isocyanate-phenylmethane, 1,6-hexamethylene diisocyanate, 1,7-heptamethylene diisocyanate, diphenylmethane-4,4'-diisocyanate, 2,2,4,4-tetramethyl-1,3-cyclobutane diisocyanate, ethylene diisocyanate as well as the comparable tri- and higher isocyanates.

The preferred polyisocyanates are the aryl diisocyanates particularly the tolylene diisocyanates. These are preferred because of their relatively low cost and availability and primarily because they produce stable thickened gasoline and kerosene solutions which are useful as fuels.

C—Amines

1. Relatively high-molecular weight primary monoamines—this term as used throughout this application refers to primary monoamines of diverse structure and origin having a molecular weight range between about 120 and 500, and containing at least eight carbon atoms. These amines are soluble in the liquid to be thickened at least to the extent that a clear 10 percent by weight solution of the amine can be prepared which is stable at 25° C. Illustrative amines which can be used include aliphatic such as the secondary-alkyl and tertiaryalkyl primary amines particularly those containing eight to 25 carbon atoms e.g. tertiary octyl-, nonyl-, decyl-, undecyl-, dodecyl- and tridecylamines, mixed secondary alkyl amines obtained by the reduction of nitrated normal paraffins, phenyl-stearyl amine, ring-alkylated cyclo-aliphatic amines in which the alkyl groups contain at least two carbon atoms, e.g. tertiary-octylcyclo-hexylamine and nonylcyclohexylamine, and ring-alkylated aromatic amines where the alkyl groups contain at least two carbon atoms. The latter include dihydroabietyl amine, tetrahdroabietyl amine, dodecylaniline, octylaniline and the like. The amines can be in the form of discrete compounds or in the form of their mixtures, either relatively purified or containing up to substantial quantities of paraffinic hydrocarbons.

2. Relatively low-molecular weight primary monoamines. This term as used throughout this application includes compounds selected from the group consisting of ammonia, and primary aliphatic monoamines containing less than seven carbon atoms, which can be solubilized or dispersed in the organic liquid to be thickened. Illustrative amines include methylamine, ethylamine, n-propylamine, isopropylamine, n-butylamine, isobutylamine, tertiary butylamine, the isomeric amylamines and hexylamines, and cyclohexylamine. Unsymmetrical disubstituted hydrazines having less than seven carbon atoms can also be used as amines in the inventive process.

D—Reaction Conditions

1. Temperature—The process can be carried out at temperatures ranging from above the freezing points of the reactants or the liquid to be thickened up to just under the boiling point of the liquid to be thickened. However especially good results have been obtained at temperatures ranging from 15° to 30° C. and for this reason these represent the preferred range especially when accompanied by vigorous agitation.

2. Time—Ordinarily very short reaction times are required although in some instances, reaction times go up to several hours or more are required to achieve maximum thickening. The process is complete when the viscosity of the liquid remains substantially constant after the addition of the final reactant.

3. Pressure—The process is ordinarily run at atmospheric pressure. Pressurized mixing vessels may be used if desired, particularly when the low-molecular weight amine is ammonia or melhylamine.

E—Preferred Process Embodiments

Whatever process varient is employed the preferred process conditions are as follows:

1. Temperature—between about 15° to 30° C.
2. Pressure—atmospheric
3. Stirring—vigorous during all additions
4. Total amine to polyisocyanate molar rotios—1.8:1 to 3.0:1 for diisocyanates, from 2.7:1 to 4.5:1 where triisocyanates are used.
5. Mole ratio of high molecular weight amine to low-molecular weight amine 5:1 to 1:5.
6. Reactants
   a. Relatively high-molecular weight primary monoamines—secondary alkyl primary monoamines, ring-alkylated cyclohexylamines and ring-alkylated anilines, containing from 8 to 30 carbon atoms are the preferred amines of this class.
   b. Relatively low-molecular weight primary monoamines—ammonia and aliphatic primary monoamines containing 3 to 6 carbon atoms are the preferred relatively low-molecular weight amines used in the inventive process.
7. Concentration of Amines and polyisocyanates—Significant increases in viscosity are observed when the concentration of total amines plus polyisocyanates used (based on the weight of the final thickened liquid) are as low as 0.05 weight percent. Higher concentration generally give higher viscosities when the required sequence of addition and molar ratios of the amines and polyisocyanate are observed. The upper limit of the concentration of the reactants is normally dependent upon the viscosity that is desired. Generally, concentrations ranging from 0.3 to 5 weight percent of the thickened organic liquid give the most satisfactory results and for this reason are preferred.

To describe this invention in the greatest possible detail, the following illustrative examples are submitted.

Examples 1–6. Preparation of Thickened Kerosene. Using t-OCTYL Amine, Sec-Butyl amine and 2,4-Tolylene Diisocyanate (TDI)

Example 1—Simultaneous Addition of All Three Components.

To a conveniently sized container equipped with stirring means and fitted with three burets is added 185. ml of Kerosene. One buret contains 1.7 ml. of t-octylamine (0.01 mole) dissolved in 5 ml. of kerosene, another 1.0 ml. of sec-butylamine (0.01 mole) dissolved in 5 ml. of kerosene and the third 1.3 ml. of tolylene diisocyanate (0.009 mole) dissolved in 5 ml. of kerosene. The 185 ml. portion of kerosene is stirred vigorously while the contents of all three burets are simultaneously run into the stirred kerosene. Within a very short time a substantial increase in viscosity takes place, which when measured by means of the Brookfield RVF Viscometer at 79° F., gives a value of 400 cp. The gelled kerosene is opaque.

Example 2—Addition of the Amines and Isocyanate of Example 1 In Sequence — In this Example the Sequence of Relatively High-Molecular Weight Amine, TDI and Relatively Low-Molecular Weight Amine is Followed.

To a conveniently sized container equipped as in example 1 is added 185 ml. of kerosene. To the stirred kerosene is added a 0.01 mole portion of t-octylamine in kerosene. After a few seconds a 0.009 mole portion of TDI is added from a buret with continued stirring. After dissolution is complete, 0.01 mole of sec-butylamine is added to the clear, unthickened stirred mixture. In less than 1 minute a very large increase in viscosity in the clear, transparent liquid is noted which upon measurement by the Brookfield Viscometer gives a viscosity at 79° F. of 14,000 cp.

Example 3—Addition of the Amines and Diisocyanate of Examples 1 and 2 In a Different Sequence.

In this variation the same reactants, concentrations, volumes of materials and mixing apparatus described in examples 1 and 2 are employed. However, in this case the order of addition to the stirred kerosene is sec-butylamine, TDI, then the tertiary-octylamine. A white, opaque, liquid mixture is obtained whose viscosity at 79° F. is determined to be 60 cp when measured by the same procedure cited in examples 1 and 2.

Example 4—Addition of the Relatively High-Molecular Weight Amine, and the Relatively Low-Molecular Weight Amine of Examples 1 to 3, Followed by TDI The same reactants, concentrations and volumes of materials and apparatus used in examples 1, 2 and 3 are again employed. However, in this case the order of addition to the stirred kerosene is tertiary-octylamine, secondary-butylamine, then TDI. The white opaque liquid had a Brookfield viscosity at 79° F. of only 40 cp. when measured as in examples 1, 2 and 3.

Example 5—Omission of the Relatively Low-Molecular Weight Amine from the Composition of examples 1 to 4.

In this example, the same kerosene, apparatus and concentrations of materials are employed as in examples 1, 2, 3 and 4. However, the relatively low-molecualr weight amine (secondary butylamine) is omitted as a reactant. The stirred kerosene thickens slightly and becomes translucent. The measured viscosity at 79° F. is only 80 cp. (using the previously described measuring procedure) showing the criticality of the two different amines to the thickening system.

Example 6 — Omission of the Relatively High-Molecular Weight Amine from the Compositions of examples 1 to 4.

In this example, the same kerosene, apparatus and concentration of materials used in examples 1, 2, 3, and 4 are employed. However, the relatively high-molecular weight amine (tert-octylamine) component is omitted from the composition and only the secondary-butylamine and TDI components are admixed with the kerosene. The liquid turns white and opaque and when its viscosity is determined as supra gives a Brookfield value at 79° F. of only 60 cps. demonstrating the criticality of both amines to the thickening system.

The preceding variations show that the maximum increase in viscosity occurred when the order of addition is: relatively high-molecular weight amine, polyisocyanate then relatively low-molecular weight amine, as in example 2. None of the other sequences of addition produced the same degree of viscosity increase.

Examples 7–32—Thickening Kerosene with Other Amine Pairs and TDI.

In these examples, 200 ml. portions of stirred kerosene (identical to that employed in examples 1 to 6) are thickened with TDI and the indicated amine pairs using the order of addition and concentrations shown in table I. This table follows at the end of the Examples and summarizes the data obtained in examples 1–47.

As can be seen from examples 10, 14, 17 and 21, maximum clarity is usually obtained when the order of addition, relatively high-molecular weight amine, relatively low-molecular weight amine, TDI is followed. On the other hand in some instances, (examples 9, 18, 20) adding the two amines first, then the TDI, produces a greater increase in viscosity but provides compositions which are not as clear as when the preceding order of addition is followed.

In example 30, as in example 2, the order of addition relatively high-molecular weight amine, TDI, relatively low-molecular weight amine provides both maximum clarity and maximum viscosity.

All of the foregoing examples illustrate without exception that the reaction in situ of two properly chosen amines with TDI in the proper molar ratio provides thickening far beyond the capabilities of either amine separately. Examples 25–27 and 31–32 illustrate that $NH_3$ is also suitable as the low-molecular weight component, in combination with an amine of high-molecular weight.

Examples 33–38—Thickening Organic Liquids other than Kerosene Using Amines of Example 1–32.

The same procedure is followed in these examples as in examples 1–32 except that organic liquids other than Kerosene were used. All were successfully thickened by the methods previously disclosed. The include: toluene, a refined naphthene base mineral oil of 100 SUS viscosity at 100° F., an unleaded premium motor gasoline base stock, a refined paraffin base mineral oil of about 350 SUS viscosity at 100° F. and a synthetic oil (di-2 ethylhexyl sebacate). These organic liquids are illustrative only and it is obvious that many other organic liquids which do not react with diisocyanates could be similarly thickened.

Examples 39–47 — Thickening Kerosene with Amine Pairs and Diisocyanates other than TDI Examples 39–47 illustrate that the remarkable ability of suitable amine pairs to thicken kerosene when reacted in situ with TDI, is also evidenced when two other chemically quite different diisocyanates are used in place of TDI, namely diphenylmethane-4,4'-diisocyanate and hexane-1,6-diisocyanate. Again the order of addition and results obtained in these examples are summarized in table I.

TABLE I

| Example | Volume organic liquid | Order of addition of ingredients (mols) 1 | 2 | 3 | Mol ratio, total amine/TDI | Mol ratio, HMWA/LMWA | Appearance | Brookfield visc., cp. at 77–79° F |
|---|---|---|---|---|---|---|---|---|
| 1 | 200 ml. kerosene | t-Octyl NH$_2$ (.01) 1.7 ml.ª | TDI (.009) 1.3 ml.ª | Sec. Bu NH$_2$ (.01) 1.0 ml.ª | 2.2:1 | 1:1 | Opaque | 400 |
| 2 | do | t-Octyl NH$_2$ (.01) 1.7 ml. | TDI (.009) 1.3 ml. | Sec. Bu NH$_2$ (.01) 0.1 ml. | 2.2:1 | 1:1 | Clear | 14,000 |
| 3 | do | Sec. Bu NH$_2$ (.01) 1.0 ml. | TDI (.009) 1.3 ml. | t-Octyl NH$_2$ (.01) 1.7 ml. | 2.2:1 | 1:1 | White, opaque | 60 |
| 4 | do | t-Octyl NH$_2$ (.01) 1.7 ml. | Sec. Bu NH$_2$ (.01) 1.0 ml. | TDI (.009) 1.3 ml. | 2.2:1 | 1:1 | do | 40 |
| 5 | do | do | TDI (.0045) 0.65 ml. | | 2.2:1 | | Translucent | 80 |
| 6 | do | Sec. Bu NH$_2$ (.01) 1.0 ml. | Same as above | | 2.2:1 | | White, opaque | 60 |
| 7 | do | CS-1192H (.01) 2.35 ml. | do | | 2.2:1 | | Clear | 70 |
| 8 | do | Iso Pr NH$_2$ (.01) 0.85 ml. | do | | 2.2:1 | | White, opaque | 46 |
| 9 | do | CS-1192H (.01) 2.35 ml. | Iso Pr NH$_2$ (.01) .85 ml. | TDI (.009) 1.3 ml. | 2.2:1 | 1:1 | Translucent | 8,000 |
| 10 | do | Same as above | TDI (.009) 1.3 ml. | Iso Pr NH$_2$ (.01) .85 ml. | 2.2:1 | 1:1 | Clear | 5,400 |
| 11 | do | Iso Pr NH$_2$ (.01) .85 ml. | Same as above | CS-1192H (.01) 2.35 ml. | 2.2:1 | 1:1 | White, opaque | 60 |
| 12 | do | CS-1192 (.01) 2.3 ml. | n-Pr NH$_2$ (.01) .82 ml. | TDI (.009) 1.3 ml. | 2.2:1 | 1:1 | Translucent | 6,750 |
| 13 | do | CS-1192 (0.01) 2.35 ml. | TDI (.009) 1.3 ml. | n-Pr NH$_2$ (.01) .82 ml. | 2.2:1 | 1:1 | Clear | 4,250 |
| 14 | do | Same as above | Same as above | n-Pr NH$_2$ (.0076) .65 ml. | 2:1 | 1.3:1 | do | 9,500 |
| 15 | do | n-Pr NH$_2$ (.01) .82 ml. | TDI (.0045) 0.65 ml. | | 2.2:1 | | White, opaque | 36 |
| 16 | do | CS-1193 (.01) 2.94 ml. | TDI (.0045) 9.65 ml. | | 2.2:1 | | Clear | 12 |
| 17 | do | Same as above | TDI (.009) 1.3 ml. | n-Pr NH$_2$ (.01) .82 ml. | 2.2:1 | 1:1 | do | 36,000 |

| Example | Volume organic liquid | Order of addition of ingredients (mols) 1 | 2 | 3 | Mol ratio, total amine/ TDI | Mol ratio, HMWA/ LMWA | Appearance | Brookfield visc., cp. at 77-79° F |
| --- | --- | --- | --- | --- | --- | --- | --- | --- |
| 18 | do | do | n-Pr NH₂ (.01) .82 ml. | TDI (.009) 1.3 ml | 2.2:1 | 1:1 | Translucent | 74,500 |
| 19 | do | Cyclohex. (.01) 1.2 ml. | TDI (.0045) .65 ml. | | | | Opaque | 21 |
| 20 | do | CS-1193 (.01) 2.94 ml. | Cyclohex. (.01) 1.2 ml. | TDI (.009) 1.3 ml | 2.2:1 | 1:1 | V. sl. haze | 82,000 |
| 21 | do | Same as above | TDI (.009) 1.3 ml. | Cyclohex. (.01) 1.2 ml. | 2.2:1 | 1:1 | Clear | 5,000 |
| 22 | do | t-OCHA (.01) 2.5 ml. | TDI (.0045) 0.65 ml. | | 2.2:1 | | do | 80 |
| 23 | do | Same as above | TDI (.009) 1.3 ml. | n-Pr NH₂ (.01) .82 ml. | 2.2:1 | 1:1 | Opaque | 31,000 |
| 24 | do | do | n-Pr NH₂ (.01) .82 ml | TDI (.009) 1.3 ml. | 2.2:1 | 1:1 | do | 31,500 |
| 25 | do | TDI (.009) 1.3 ml | NH₃ gas | | (ᵇ) | | Cloudy | 16 |
| 26 | do | CS-1192H (.01) 2.35 ml. | TDI (.0045) .65 ml. | | 2.2:1 | | Clear | 70 |
| 27 | do | Same as above | TDI (.007) 1.0 ml. | NH₃ gas | (ᵇ) | (ᵇ) | Opaque | 10,500 |
| 28 | do | DDA (.01) 2.9 ml. | TDI (.0045) .65 ml. | | 2.2:1 | | Clear | 300 |
| 29 | do | Same as above | Cyclohex. (.01) 1.2 ml. | TDI (.009) 1.3 ml. | 2.2:1 | 1:1 | Clear on top, ppte. on bottom. | 29,500 |
| 30 | do | do | TDI (.009) 1.3 ml. | Cyclohex. (.01) 1.2 ml. | 2.2:1 | 1:1 | V. sl. haze | 200,000 |
| 31 | do | PSA (.007) 2.4 g. | TDI (.0062) 0.9 ml. | NH₃ gas | (ᵇ) | (ᵇ) | Sl. hazy gel | 39,000 |
| 32 | do | Same as above | TDI (.006) 0.8 ml. | | 1.1:1 | | Clear | 9 |
| 33 | 200 ml. toluene | CS-1193 (.0068) 2.0 ml. | TDI (.009) 1.3 ml. | Iso Pr NH₂ (.0118) 1.0 ml. | 2:1 | 1:1.74 | do | 73,000 |
| 34 | 200 ml. 100 PO HF | Same as above | Same as above | Same as above | 2:1 | 1:1.74 | Translucent | 40,000 |
| 35 | 200 ml. UL S.C. | do | do | do | 2:1 | 1:1.74 | Clear | 57,000 |
| 36 | 200 ml. PBMO | do | do | do | 2:1 | 1:1.74 | Opaque | 1,260 |
| 37 | Same as above | t-OCHA (.01) 2.5 ml. | do | n-Pr NH₂ (.01) .82 ml. | 2.2:1 | 1:1 | do | 4,350 |
| 38 | 200 ml. 2-EHS | Same as above | do | Same as above | 2.2:1 | 1:1 | do | 480 |
| 39 | 200 ml. toluene | CS-1192 (0.015) 3.5 ml. | DPMD (0.0068) 1.7 g. | | 2.2:1 | | Cloudy | 290 |
| 40 | do | Iso Pr NH₂ (0.01) .85 ml. | DPMD (0.0044) 1.1 g. | | 2.2:1 | | Cloudy, grainy | 150 |
| 41 | do | CS-1193 (0.02) 5.9 ml. | DPMD (0.009) 2.2 g. | | 2.2:1 | | Translucent | 3,750 |
| 42 | do | CS-1193 (0.015) 4.4 ml. | Iso Pr NH₂ (0.005) 0.4 ml. | DPMD (0.009) 2.2 g. | 2.2:1 | 3:1 | Hazy, translucent. | 25,500 |
| 43 | 200 ml. kerosene | CS-1192 (0.01) 2.35 ml. | DICH (.0045) 0.65 ml. | | 2.2:1 | | Clear sl. ppte. | 10 |
| 44 | do | CS-1193 (0.015) 4.3 ml. | DICH (0.07) 1.0 ml. | | 2.2:1 | | Clear | 9 |
| 45 | do | Iso Pr NH₂ (0.01) .85 ml. | DICH (0.0045) 0.65 ml. | | 2.2:1 | | Opaque soft gel | 810 |
| 46 | do | CS-1192 (0.01) 2.35 ml. | DICH (0.009) 1.3 ml. | Iso Pr NH₂ (0.01) .85 ml. | 2.2:1 | 1:1 | Opaque gel | 13,500 |
| 47 | do | CS-1193 (0.015) 4.3 ml. | Same as above | Same as above | 2.2:1 | 3:1 | do | 90,000 |

ᵃ Ingredients added simultaneously.  ᵇ Indeterminate.

ABBREVIATIONS — (TABLE I)
TDI = 2,4-Tolylene Diisocyanate
HMWA = High Molecular Weight Amine
LMWA = Low Molecular Weight Amine
sec.Bu NH₂ = Secondary Butylamine
CS-1192 = C₁₀-Secondary Alkyl Primary Amines
CS-1193 = C₁₄₋₁₅ Secondary Alkyl Primary Amines
Iso Pr NH₂ = Isopropylamine
n-Pr NH₂ = n-Propylamine
Cyclohex. = Cyclohexylamine
t-OCHA = tert Octyl Cyclohexylamine
DDA = Dodecylaniline
PSA = Phenyl Stearyl Amine
100 PO HF = Paraffin Base 100 Neutral Oil
UL S.C. = Unleaded Motor Gasoline
PBMO = Paraffin Based Mineral Oil SUS Viscosity at 100° F. 325-350
2-EHS = 2-Ethylhexyl Sebacate
DPMD = Diphenylmethane-4,4'-Diisocyanate
DICH = 2,6 Diisocyanato Hexane Utility Embodiment A — Utilization of a Thickened Mineral Spirit - Linseed Oil as a Paint Vehicle In this example an illustrative paint formulation is prepared by stirring a 200 mol blend comprising 133 ml. of mineral spirits and 67 ml. of raw linseed oil and adding the following ingredients in the quantities and order indicated:
a. 1.0 ml. OF C₁₄-C₁₅ secondary alkyl primary amine,
b. 1.2 ml. of tolylene diisocyanate, (TDI) and
c. 2.4 ml. of isopropylamine.

An immediate thickening is observed in the paint vehicle. Then 100 grams of finely powered titanium dioxide pigment is added to the thickened vehicle and the mixture is stirred until uniform.

A control run is repeated in a 200 ml. blend comprising 135 ml. of mineral spirits and 67 ml. of raw linseed oil but in the absence of amines and TDI. Again a 100 gram portion of the Titania pigment used above is added and the mixture blended as before. Both formulations are removed from stirring and allowed to stand for 7 days. At the end of this time the amine-diisocyanate thickened paint formulation is free from sediment and can be hand-stirred to a utilizable uniform consistency suitable for application In contrast the control batch consisted of a solid layer of dense, virtually unstirrable pigment covered by clear oil and is unusable for paint application.

In a related experiment the same results are obtained in the above thickened linseed oil — mineral spirit mixture when calcium carbonate is substituted for titanium dioxide on a weight-by-weight basis, all of the quantities of the liquid components being kept constant.

Utility Embodiment B — Utilization of Thickened Kerosene as a Retardant for Rapid Flame Propagation Recently there has been considerable concern shown over the dangers of the rapid flame propagation normally demonstrated by untreated kerosene based jet fuels particularly when fuel tanks are accidentally ruptured. See for example the 1966 Proceedings of the Guggenheim Aviation Center (Cornell University) held at Fort Monroe, Virginia, concerning Aircraft Fluids, Fire Hazards. The tests below demonstrate the utility of a typical thickened kerosene of this invention as a retardant for rapid flame propagation compared to the unthickened kerosene.

A 4 gram sample of the gel produced in example 31 is ignited in a 4.5 inch diameter evaporating dish. The burning time is 290 seconds. A 4 gram sample of the neat kerosene used in Example 31 is similarly ignited in the same sip dish and burns completely in only 115 seconds. These tests indicate an almost threefold increase in burning time directly attributable to the inventive thickening system The inventive process is advantageous in several respects. For example, low concentrations of known relatively high-moleuclar weight amines, relatively low-molecular weight amines and polyisocyanate produce substantial and reproducible increases in the viscosity of organic liquids under mild reaction conditions. Further, the resultant compositions are ashless on combustion, and, in the case of thickened kerosenes and similar distillate fractions, are eminently suitable for use as jet fuels and which are less likely to propagate intense fires under conditions of accidental ignition. In addition in many instances, the thickened liquids are translucent or transparent in appearance which make them desirable for formulation in consumer-oriented products.

The results obtained in the inventive process are quite surprising in that both the use of two different amines neither of which is a highly effective thickening agent alone, and the sequence of addition of the reactants are the most important factors in determining the extent of thickening. Thus the inventive process premits the use of readily available, low-cost ammonia and amines for thickening purposes which are unusuable using the processes of the prior art.

Numerous changes, modifications and substitutions can be made ib the inventive process without departing from the inventive concept. The metes and bounds of this invention are best determined by the claims which follow, taken in conjunction with the preceding specifications.

What is claimed is:

1. A process for thickening organic liquids comprising:
    1. mixing the organic liquid to be thickened with the following components:
    a. at least one relatively high-molecular weight primary monoamine having a molecular weight range between about 120 and 500, soluble in aid liquid,
    b. at least one relatively low-molecular weight primary amine containing less than 7 carbon atoms soluble or dispersible in said organic liquid, and
    c. at least one organic polyisocyanate containing 2 or more reactive isocyanate, said components totaling at least 0.05 percent by weight of the finished composition, said molar ratio of the relatively high-molecular weight amine to relatively low-molecular weight amine ranging from 10:1 to 1:10 and the molar ratio of the total amine to polyisocyanate being at least 1.8:1, to produce a homogeneous reaction mixture and
    2. continuing mixing said reaction mixture until a thickened organic liquid is produced.

2. The process of claim 1 wherein the relatively high-molecular weight amine, the relatively low-molecular weight amine and the organic polyisocyanate are simultaneously added to said organic liquid to be thickened.

3. The process of claim 1 wherein the relatively low-molecular weight amine is added first to the organic liquid to be thickened, followed by the relatively high-molecular weight amine, and then finally followed by the polyisocyanate, to produce the thickened organic liquid.

4. The process of claim 1 wherein the hydrocarbon is selected from the group consisting of kerosene and gasoline.

5. The process of claim 1 wherein the organic liquid to be thickened is an alkyl of an acid selected from the group consisting of dibasic carboxylic acids and polybasic carboxylic acids.

6. The process of claim 1 wherein the organic polyisocyanate is an aromatic polyisocyanate.

7. The process of claim 1 wherein the organic polyisocyanate is an aliphatic polyisocyanate.

8. The process of claim 1 wherein the relatively low molecular weight monoamine is selected from the group consisting of primary aliphatic monoamines containing less than 7 carbon atoms and ammonia.

9. The process of claim 1 wherein the relatively high-molecular weight primary monoamine and the relatively low-molecular weight primary monoamine are first admixed together and then the polyisocyanate is subsequently added to the amine admixture to form the thickened organic liquid.

10. The process of claim 1 wherein the relatively high-molecular weight primary monoamine and the polyisocyanate are first admixed together, and then the relatively low-molecular weight primary monoamine is subsequently added to the amine-polyisocyanate admixture to form the thickened organic liquid.

11. The process of claim 9 wherein the organic polyisocyanate is an aromatic diisocyanate.

12. The process of claim 9 wherein the organic polyisocyanate is an aliphatic diisocyanate.

13. The process of claim 10 wherein the organic polyisocyanate is an aromatic diisocyanate.

14. The process of claim 10 wherein the organic polyisocyanate is an aliphatic diisocyanate.

15. The process of thickening hydrocarbon liquids comprising the steps of:
    a. admixing the hydrocarbon liquid to be thickened with
        1. at least one relatively high-molecular weight primary aliphatic monoamine having a molecular weight range between about 120 and 500, said monoamine containing 8 to 25 carbon atoms, and which is soluble in said liquid, and
        2. at least one organic diisocyanate to form a reaction mixture, then
    b. contacting said reaction mixture with at least one relatively low molecular weight primary aliphatic monoamine containing from 0 to 6 1:10atoms which is soluble or dispersible in said liquid, to form a reaction mixture in which the total concentration of amines plus diisocyanate comprises between 0.05 to 15 percent by weight of the weight of the thickened hydrocarbon liquid, and the molar ratio of the relatively high molecular weight amine to the relatively low molecular weight amine ranges from about 10:1 to 1:10, and the molar ratio range of total amines to aromatic diisocyanate being from about 1.8:1 to 3.0:1, until a substantial increase in the viscosity of the hydrocarbon liquid takes place.

16. The process of thickening hydrocarbon liquids comprising the steps of:
    a. admixing the hydrocarbon liquid to be thickened with
        1. at least one relatively high-molecular weight primary aliphatic monoamine containing 8 to 25 carbon atoms which is soluble in said liquid, and
        2. at least one relatively low-molecular weight primary aliphatic monoamine containing 3 to 6 carbon atoms which is soluble or dispersible in said liquid, then
    b. contacting at least one organic diisocyanate with said mixture, to form a reaction mixture in which the total concentration of amines plus diisocyanate comprising between 0.05 to 15 percent by weight of the thickened hydrocarbon liquid, and the molar ratio of the relatively high molecular weight amine to the relatively low-molecular weight amine ranges from about 10:1 to 1:10, and the molar ratio range of total amines to aromatic diisocyanate being from about 1.8:1 to 3.0:1.

17. The process of claim 15 wherein the organic diisocyanate is a tolylene diisocyanate.

18. The process of claim 15 wherein the organic diisocyanate is a 2,6-diisocyanate hexane.

19. The process of claim 16 wherein the organic diisocyanate is a tolylene diisocyanate.

20. The process of claim 16 wherein the organic diisocyanate is a 2,6-diisocyanate hexane.

21. The process of claim 15 wherein the hydrocarbon is kerosene

22. The process of claim 16 wherein the hydrocarbon is a kerosene

23. An ashless thickened fuel composition comprising
   a. from about 95 to 99.5 parts by weight of a hydrocarbon distillate fraction,
   b. from about 5.0 to 0.5 parts by weight of a thickener composition comprising:
      1. at least one relatively high-molecular weight primary monoamine soluble in said distillate fraction,
      2. at least one relatively low molecular weight primary monoamine soluble or dispersible in said distillate fraction, and
      3. at least one aromatic diisocyanate, said molar ratio of the relatively high molecular weight primary amine to the relatively low molecular weight primary amine being between about 5.1 to 1:5, said molar ratio of total amines to aromatic polyisocyanate being between about 1.8:1 to 3.0:1.

24. The thickened fuel composition of claim 23 wherein the hydrocarbon distillate portion is a kerosene and the aromatic diisocyanate is a tolylene diisocyanate.

25. The thickened fuel composition of claim 23 wherein the hydrocarbon distillate portion is a gasoline and the aromatic diisocyanate is a tolylene diisocyanate.

* * * * *

PO-1050
(5/69)

UNITED STATES PATENT OFFICE
CERTIFICATE OF CORRECTION

Patent No. 3,620,695               Dated November 16, 1971

Inventor(s) Frederic C. McCoy

It is certified that error appears in the above-identified patent and that said Letters Patent are hereby corrected as shown below:

ABSTRACT, line 3:    "rates" should read --ratios--
Col. 1, line 71:     "in" should read --a--
Col. 2, line 38      "on" should read --in--
Col. 2, line 56:     "relative" should read --reactive--
Col. 3, line 3:      "Polyiscyanates" should read --Polyisocyanates--
Col. 3, line 41:     "tetrahdroabietyl" should read --tetrahydrobietyl--
Col. 4, line 2:      "melhylamine" should read --methylamine--
Col. 4, line 30:     "concentration" should read --concentrations--
Cols. 5&6, Table I:  Example 2, under heading "3": "0.1 ml" should read --1.0 ml--
Cols. 5&6, Table I:  last column under Example 16, "12" should read --42--

Col. 7, line 50:     "CS-1192=$C_{10}$" should read --CS-1192=$C_{10-14}$--
Col. 9, line 11:     "moleuclar" should read --molecular--
Col. 9, line 27:     "premits" should read --permits--
Col. 9, line 32:     "ib" should read --in--
Col. 9, Claim 1,
 line 42:            "aid" should read --said--
Col. 9, Claim 5,
 line 69:            After "alkyl" should be added --ester--
Col. 10, line 37:    "0 to 6 1:10atoms" should read --0 to 6
Claim 15.             carbon atoms--
Col. 10, Claim 16, line 60,
first occurrence of "mixture" should read --admixture--

Signed and sealed this 21st day of May 1974.

(SEAL)
Attest:

EDWARD M.FLETCHER,JR.              C. MARSHALL DANN
Attesting Officer                  Commissioner of Patents